United States Patent Office 3,142,698
Patented July 28, 1964

3,142,698
CYANOACRYLATE ESTERS
Benjamin D. Halpern, Jenkintown, Jack Dickstein, Elkins Park, and Rose-Marie Hoegerle, Linden, N.J., assignors to The Borden Company, New York, N.Y., a corporation of New Jersey
No Drawing. Filed Oct. 3, 1960, Ser. No. 59,801
4 Claims. (Cl. 260—465.4)

This invention relates to cyanoacrylate esters.

These esters have the special feature of an ethenoid bond which makes possible polymerization and cross-linking.

Our invention comprises the new cyanoacrylates of the class illustrated in the following table and adhesives made therewith.

| Compound name | Formula |
|---|---|
| Allyl 2-cyanoacrylate | $CN-\underset{\parallel}{C}(CH_2)-COOCH_2-CH=CH_2$ |
| Ethylene glycol di-2-cyanoacrylate | $CN-\underset{\parallel}{C}(CH_2)-COOCH_2CH_2OOC-\underset{\parallel}{C}(CH_2)-CN$ |
| Dicyanoacrylates of Polyethylene glycol | $CN-\underset{\parallel}{C}(CH_2)-COO(C_2H_4-O-C_2H_4)_xOOC-\underset{\parallel}{C}(CH_2)-CN$ |
| Neopentyl glycol di-2-cyanoacrylate | $CN-\underset{\parallel}{C}(CH_2)-COOCH_2-\underset{CH_3}{\overset{CH_3}{C}}-CH_2OOC-\underset{\parallel}{C}(CH_2)-CN$ |

Here $x$ is an integer within the approximate range 2–30.

These compounds are made as shown in the following examples, except where specifically stated to the contrary, all dryings being made over anhydrous magnesium sulfate at room temperature and all proportions, here and elsewhere herein, being expressed by weight.

*Example 1.—Allyl 2-Cyanoacrylate*

Allyl cyanoacetate, the intermediate, was first made as follows: 85 g. cyanoacetic acid was heated at reflux with 450 ml. allyl alcohol and 1.5 g. p-toluene-sulfonic acid, as esterification catalyst, for 3 hrs. The excess of allyl alcohol and the formed water were slowly distilled off over a period of 4 hrs. The residue was dissolved in 600 ml. ether, washed with a saturated solution of potassium bicarbonate in water, dried, filtered and the solvent distilled off at atmospheric pressure. The residue yielded 109 g. (87.5% of theory) of allyl cyanoacetate, B.P. 89°–90° (3.8 mm.), $n_D^{28}$ 1.4393.

Analysis.—Percent calcd. for $C_6H_7NO_2$: C, 57.6; H, 5.6. Found: C, 58.0; H, 5.9.

Infrared spectrum: shows allylic carbon-carbon double bond peak at 1650 cm.$^{-1}$, i.e.,

20 g. of the allyl cyanoacetate were mixed with 4 drops of piperidine as condensation agent and then with 13 g. of a 37% solution of formaldehyde in water and 50 mg. hydroquinone monomethylether as inhibitor, the reaction temperature being maintained at 60° C. After an additional hour at a temperature of 60°–70° C., a colorless foamy organic material had separated. The aqueous phase was discarded and the foamy material dissolved in benzene and filtered. The filtered benzene solution was evaporated and the residue heated to 135° C. at a pressure of 2 mm. of mercury, to yield a residue of 12 g. of allyl 2-cyanoacrylate, a solid of melting point 120°–135° C. The substance was sublimed at 100°–110° C. and 0.2 mm. pressure. It was soluble in acetone, methyl ethyl ketone, and methylene chloride, slightly soluble in benzene, chloroform and methylene chloride, and insoluble in methanol and ethanol.

A solution of the product in acetone, treated with potassium permanganate solution, gave a brown precipitate indicating the presence of a carbon-carbon double bond.

Analysis.—Percent, calcd. for $C_7H_7NO_2$: C, 61.3; H, 5.2; N, 10.2%. Found: C, 61.6; H, 5.2; N, 10.4.

For use as an adhesive, the allyl 2-cyanoacrylate so made is dissolved in a solvent therefor, e.g., a volatile ketone such as acetone, methyl ethyl ketone or mixtures thereof, as in the proportion of about 1–10 parts of the ketone for 1 part of the said cyanoacrylate.

*Example 2.—Ethylene Glycol Dicyanoacrylate*

Ethylene glycol dicyanoacetate was first made as the intermediate as follows: A mixture of 190 g. cyanoacetic acid, 62 g. ethylene glycol, 5 g. p-toluenesulfonic acid and 440 g. anhydrous benzene were heated to reflux with continuous stirring for 10 hours. During this period, the theoretical amount of water was formed, distilled away, and collected in a water trap. As the dicyanoacetate ester formed, the benzene separated. The benzene was removed by distillation under reduced pressure and replaced by 1,000 g. methylene dichloride. The resulting solution was washed with saturated aqueous potassium bicarbonate solution followed by washing with water. The washed liquid that remains was dried, filtered and the volatiles distilled off. The oily residue that remained was first dried under 12 mm. pressure and subsequently for 4 hrs. under 0.5 mm. pressure, yielding 170 g. colorless crystals of ethylene glycol dicyanoacetate of M.P. 37°–40° C. Recrystallization from methanol gave thin needles of M.P. 41°–45° C. and B.P. 210° C. at 2 mm.

Analysis.—Percent calcd. for $C_8H_8N_2O_4$: C, 48.8; H, 4.1. Found: C, 48.5; H, 4.5.

The ethylene glycol dicyanoacetate so made was then mixed in the amount of 1 mole with 2 moles of formaldehyde and condensed, in benzene solution in contact with 0.2 mole of zinc acetate dihydrate as condensing agent and heated as stated in Example 1. The water formed in the condensation was distilled off and collected in a water trap.

The benzene was removed by boiling under atmospheric pressure. The residue remaining was then washed with three separate portions of dioxane and thus separated from impurities preferentially soluble in the dioxane. The residue so washed was dried as above. The residue was ethylene glycol 2,2'-dicyanoacrylate.

*Example 3.—Polyethylene Glycol Dicyanoacrylate*

The composition and procedure of Example 2 were followed except that the ethylene glycol there used was replaced, first, by an equimolecular proportion of diethylene glycol, so that the intermediate compound first formed was diethylene glycol dicyanoacetate. This was then condensed with formaldehyde and processed as described in Example 2.

In a modification of this example, the diethylene glycol is substituted by an equimolar weight of another polyethylene glycol, as for example one of mean molecular weight about 800–1200, as, for example by glycol 400 and glycol 1000, used separately and in turn. The products are alphaacrylates of the polyglycols, characterized by cross-linking properties because of their difunctional nature.

*Example 4.—Condensing Agents*

The following table shows the effect of use of various condensing agents in the processes of Examples 2 and 3, different inhibitors of ethenoid bond polymerization added to the dicyanoacrylate esters finally made, different atmospheres under which the mixture was maintained during the condensation, the amount of water separated from the trap during the condensation, as percent of the theoretical maximum for a perfect yield of condensed product, the reaction time in hours, and the nature of the finished glycol di-2-cyanoacrylate. In this table the zinc acetate, when used, was in every case the dihydrate. In two cases the zinc acetate was used in combination with acetic acid (AcOH) as shown. The abbreviations "DEG" and "EG" represent diethylene glycol and ethylene glycol, respectively.

| Glycol Used | Condensing Agent | Inhibitor | Atmosphere during Condensation | Water Sep., Percent of theory | Reaction Time, hours | Nature of End Product |
|---|---|---|---|---|---|---|
| DEG | | t-butyl catechol | $N_2$ | 67 | 5 | Rubbery mass. |
| DEG | Zn(OAc)$_2$—AcOH | | air | 87 | 0.75 | Highly viscous oil. |
| DEG | Piperidine | $SO_2$ | $SO_2$ | 24 | 2.0 | Hard, white solid precipitate. |
| DEG | Piperidine acetate | | air | 48 | 2.0 | Polymeric gel. |
| EG | Zn(OAc)$_2$ | | air | 72 | 0.75 | Orange red gel. |
| EG | Zn(OAc)$_2$—AcOH | | air | 25 | 1.30 | Hard, rubbery. |
| EG | Piperidine acetate | | air | 0.5 | 0.10 | Hard, white polymeric. |

These esters of the glycols are adhesives. They are suitable for application to glass, paper, aluminum foil or the like, as in a solution of 20 parts of the esters for 100 of a volatile ketone solvent.

*Example 5.—Neopentyl Glycol Di-2-Cyanoacrylate*

A mixture of 52 g. neopentyl glycol, 94 g. cyanoacetic acid, 2 g. p-toluenesulfonic acid and 265 g. benzene were refluxed for 17 hours, during which the theoretical amount of water was azeotroped away. There was only one phase of the remaining mixture. It was washed with aqueous potassium carbonate solution, dried, and filtered. On distilling off the solvent a colorless oily residue was obtained which did not crystallize after several hours of further drying under 0.5 mm. pressure at room temperature. 113 g. of neopentyl glycol dicyanoacetate was isolated.

The infrared absorption spectrum showed that there was no cyanoacetic acid remaining in the product.

11.9 g. of this neopentyl glycol dicyanoacetate was added gradually to 3.5 g. paraformaldehyde in 44 g. of benzene, containing 3 drops of piperidine, at 75° C. Immediately a colorless precipitate separated. After boiling for 6.5 hr., 1.9 g. water (100% of theory) had separated in the water trap. The residue in the reaction mixture was filtered, washed several times with benzene and dried, yielding 13.0 g. of neopentyl glycol di-2-cyanoacrylate of decomposition range 240°–295° C. and of solubility only very slight in chloroform, benzene, acetone, methyl ethyl ketone, and ethyl acetate.

Infrared absorption spectrum: 2250 cm.$^{-1}$ (C≡N); 1620, 940, 865 cm.$^{-1}$

The neopentyl di-2-cyanoacrylate is unusually resistant to decomposition by heat.

*Example 6.—Cross-Linking*

The cyanoacrylate esters described herein undergo cross-linking more rapidly at elevated temperatures such as 80°–150° C. To accelerate the rate of cross-linking or to lower the temperature used, we may incorporate an initiator such as any of the percompounds commonly used to initiate ethenoid bond polymerization, e.g., sodium or potassium persulfate, benzoyl peroxide and azobisisobutyronitrile, as in the proportion of about 0.5%–1% of the percompound on the weight of the dicyanoacrylate on the dry basis.

In a modification of this example, the cyanoacrylate esters representing the final products of each of the Examples 1–3 and 5 are copolymerized with an ethenoid comonomer, e.g., vinyl chloride, vinyl acetate, methyl or ethyl acrylate or methacrylate, styrene, or vinyl toluene, in the proportion of about 1–9 parts total weight of the cyanoacrylate and the said comonomer, and with 10% of any of the initiators above on the said total weight, at 100° C.

To make an adhesive, the final product of any of the Examples 1–6 is dissolved in any anhydrous and chemically inert solvent therefor of which N,N-dimethylformamide is an example. Proportions of the solvent that are suitable are 2–10 parts for 1 part of the said final product.

The adhesives made as described herein are applied to the surface to be bonded and maintained at a temperature to give setting of the adhesive at the desired rate. For most purposes this requires either no warming or only moderate warming.

It will be understood that it is intended to cover all changes and modifications of the examples of the invention herein chosen for the purpose of illustration which do not constitute departures from the spirit and scope of the invention.

We claim:

1. An ester selected from the group consisting of the di-2-cyanoacrylate esters of ethylene glycol, polyethylene glycol of molecular weight about 800–1200, and neopentyl glycol.

2. Ethylene glycol di-2-cyanoacrylate of the formula

3. Polyethylene glycol di-2-cyanoacrylate of the formula $$CN-\overset{CH_2}{\underset{\|}{C}}-COO(C_2H_4-O-C_2H_4)_xOOC-\overset{CH_2}{\underset{\|}{C}}-CN$$

$x$ being an integer within the approximate range 2–30.

4. Neopentyl glycol di-2-cyanoacrylate of the formula

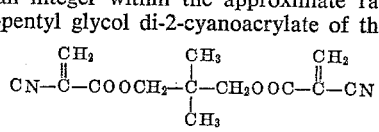

References Cited in the file of this patent

UNITED STATES PATENTS

| | | |
|---|---|---|
| 2,624,751 | Mowry et al. | Jan. 6, 1953 |
| 2,776,232 | Shearer et al. | Jan. 1, 1957 |
| 3,036,066 | Sims | May 22, 1962 |